United States Patent
Fontana, Jr. et al.

(10) Patent No.: US 7,414,816 B2
(45) Date of Patent: Aug. 19, 2008

(54) PLANAR MAGNETIC THIN FILM HEAD

(75) Inventors: Robert E. Fontana, Jr., San Jose, CA (US); Kuok San Ho, Santa Clara, CA (US); Ching Hwa Tsang, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 458 days.

(21) Appl. No.: 10/857,776

(22) Filed: May 28, 2004

(65) Prior Publication Data

US 2005/0264944 A1 Dec. 1, 2005

(51) Int. Cl.
*G11B 5/33* (2006.01)
*G11B 5/127* (2006.01)
*G11B 5/147* (2006.01)

(52) U.S. Cl. ............... 360/318.1; 360/313; 360/125.63; 360/125.22; 360/318

(58) Field of Classification Search ................. 360/317, 360/313, 319, 324.12, 324, 324.1, 321, 126, 360/125, 318, 318.1
See application file for complete search history.

(56) References Cited

U.S. PATENT DOCUMENTS

| | | | |
|---|---|---|---|
| RE33,949 E | | 6/1992 | Mallary et al. |
| 5,491,606 A | * | 2/1996 | Hesterman et al. ........ 360/318.1 |
| 5,673,163 A | * | 9/1997 | Cohen ........................ 360/126 |
| 5,949,624 A | * | 9/1999 | Simmons et al. .......... 360/318.1 |
| 6,388,846 B1 | * | 5/2002 | Albertini et al. .......... 360/318.1 |
| 7,140,094 B2 | * | 11/2006 | Nemoto .................... 29/603.14 |
| 2001/0053051 A1 | * | 12/2001 | Umehara et al. .......... 360/318.1 |
| 2002/0109947 A1 | * | 8/2002 | Khizroev et al. ............ 360/319 |
| 2002/0176214 A1 | * | 11/2002 | Shukh et al. ................ 360/317 |
| 2003/0053269 A1 | * | 3/2003 | Nishiyama ................ 360/324.1 |
| 2003/0143431 A1 | * | 7/2003 | Hasegawa ................... 428/692 |
| 2003/0151850 A1 | | 8/2003 | Nakamura et al. |
| 2003/0227714 A1 | * | 12/2003 | Parker et al. ................. 360/125 |
| 2004/0041679 A1 | * | 3/2004 | Saito et al. ................... 336/200 |
| 2004/0218310 A1 | * | 11/2004 | Nishioka .................... 360/313 |
| 2005/0068669 A1 | * | 3/2005 | Hsu et al. .................... 360/125 |

* cited by examiner

*Primary Examiner*—Andrea Wellington
*Assistant Examiner*—Adam B Dravininkas
(74) *Attorney, Agent, or Firm*—G. Martin Knight (57) ABSTRACT

A magnetic head (slider) which requires no lapping is described. The head is fabricated with an air bearing surface that is parallel to the wafer surface. The saw cuts used to separate the individual sliders from the rest of the wafer are perpendicular to the air-bearing surface and do not pass through any critical features. The read and write components are formed from thin films disposed parallel to the air bearing surface and can be side-by-side or tandem in relation to the recording track. The stripe height of the read sensor is controlled by the deposition process rather than by lapping. Various embodiments of the read head include contiguous junction biasing, external hard magnet biasing, and in-stack biasing. In one embodiment a permeable field collector is included below the sensor layer structure. An aperture shield surrounding the sensor at the ABS is included in one embodiment.

19 Claims, 7 Drawing Sheets

PLANAR MAGNETIC THIN FILM HEAD

FIELD OF THE INVENTION

The invention relates to magnetic thin film heads for recording and more particularly to designs of such heads which can be fabricated without lapping.

BACKGROUND OF THE INVENTION

In a typical prior art magnetic disk recording system a slider containing magnetic transducers for reading and writing magnetic transitions is supported by a suspension as it flies above the disk that is being rotated by a spindle motor.

The disk includes a plurality of thin films and at least one ferromagnetic thin film in which the recording (write) head records the magnetic transitions in which information is encoded. The magnetic domains in the media on can be written longitudinally or perpendicularly. The read and write head portions of the slider are built-up in layers using thin film processing techniques. Typically the read head is formed first, but the write head can also be fabricated first. The conventional write head is inductive and the read sensor is magnetoresistive.

In a disk drive using perpendicular recording the recording head is designed to direct magnetic flux through the recording layer in a direction which is perpendicular to the plane of the disk. Typically the disk for perpendicular recording has a hard magnetic recording layer and a magnetically soft underlayer. During recording operations using a single-pole type head, magnetic flux is directed from the main pole of the recording head perpendicularly through the hard magnetic recording layer, then into the plane of the soft underlayer and back to the return pole in the recording head. The shape and size of the main pole piece and associated shields are the primary factors in determining the track width.

In US published application 2003/0151850 by Nakamura, et al., a single pole head is described which has the main pole down-track. The main pole is composed of at least two portions where the width of the first portion continuously increases from the up-track side to the down-track side in the direction of the moving medium and the width of the second portion is the same as the width of the first portion's down-track edge in the direction of the moving medium and is constant from the up-track side to the down-track side in the medium moving direction. This is said to prevent the recording magnetic field strength from decreasing at the track edge and increases the effective track width while suppressing side-writing, thereby, realizing a magnetic recording disk apparatus with a high track density.

In U.S. patent RE 33,949 to Mallary, et al. a single pole head for perpendicular recording is described which includes what is called a "downstream shield" (down-track) that is connected to the write pole at the back and separated from the write pole by a small gap at the ABS. The ABS face of the shield is designed to be many times as large as the face of the write pole section so that the flux return section acts as a magnetic shield. The density of the flux from the write pole tip is sufficient to effect a vertical recording while the density of the flux passing into the downstream magnetic shield is low so a previously recorded pattern is not reversed or weakened.

In the typical process of fabricating thin film magnetic transducers, a large number of transducers are formed simultaneously on a wafer. After the basic structures are formed the wafer may be sawed into rows or individual transducers. Although sawing has been the typical method for separating the wafers into individual sliders, recently reactive ion etching (RIE) or deep reactive ion etching (DRIE) with a fluorine containing plasma have been used. The surfaces of the sliders perpendicular to the surface of the wafer that are exposed when the wafers are cut eventually form the air bearing surface (ABS) of the slider. The uncertainty of the saw plane leaves unacceptable variations in the magnetic stripe height which would lead to unacceptable variations in magnetic performance if not corrected. Lapping is the process used in the prior art to achieve stripe height control in the nanometer range. For perpendicular recording heads with a trailing shield, the thickness of the trailing shield is also determined by the endpoint of the lapping process.

After lapping, features typically called "rails" are formed on the ABS of magnetic transducer. The rails have traditionally been used to determine the aerodynamics of the slider and serve as the contact area should the transducer come in contact with the media either while rotating or when stationary.

SUMMARY OF THE INVENTION

A magnetic head (slider) for perpendicular recording which requires no lapping will be described. The head is fabricated with an air bearing surface that is parallel to the wafer surface. The saw cuts used to separate the individual sliders from the rest of the wafer are perpendicular to the air-bearing surface and do not pass through any critical features. The read and write components are formed from thin films disposed parallel to the air bearing surface and can be side-by-side or tandem in relation to the recording track. Standard lithographic techniques can be used to define the shapes, gaps and pole piece dimensions.

The stripe height of the read sensor is controlled by the deposition process rather than by lapping. Various embodiments of the read head include contiguous junction biasing, external hard magnet biasing, and in-stack biasing. In one embodiment a permeable field collector is included below the sensor layer structure. An aperture shield surrounding the sensor at the ABS is included in one embodiment.

DETAILED DESCRIPTION OF THE INVENTION AND THE PREFERRED EMBODIMENTS

The various embodiments of heads described herein require no lapping.

Figure 4:
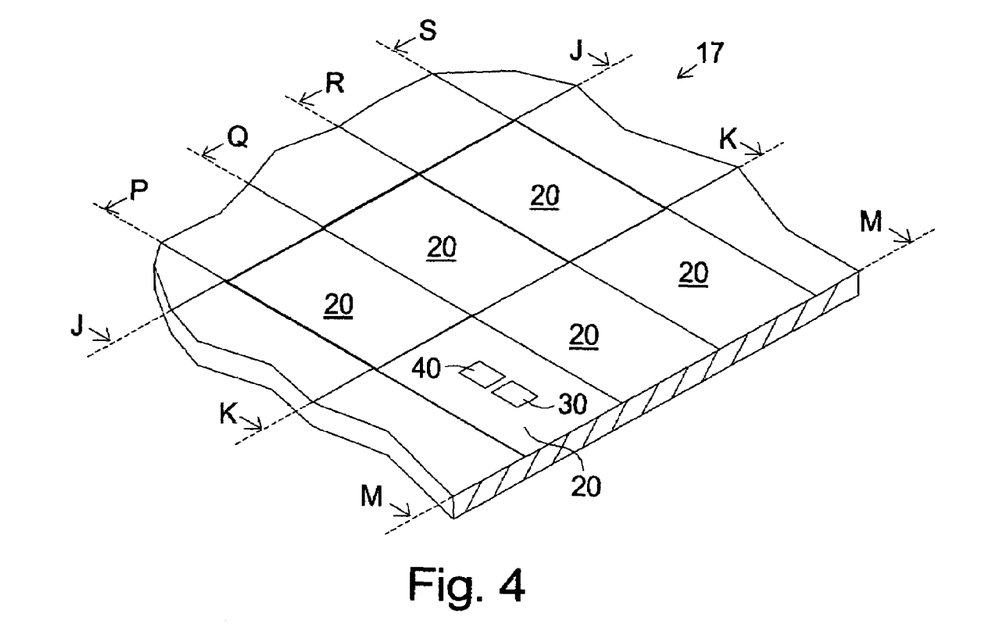
FIG. 4 is an isometric illustration of the cut lines for a wafer with a plurality of heads fabricated according to the invention.

In order to implement this head design, the write head and the read head must be integrated into a fabrication process in which the wafer surface and the thin film layers in a head according to the invention are parallel to the ABS. In the prior art method of fabricating heads the thin films are deposited on the surface of the wafer and are, of course, parallel to the wafer surface, but the wafer, along with the thin films, is cut to expose the edges of the thin film layers. The prior art ABS processing, including lapping, is performed on the exposed edges and the final ABS is oriented perpendicular to the plane of the thin films. In contrast, the ABS is on top of the wafer according to the invention and the cuts made to separate the head from the plurality of other heads on the wafer are made in nonfunctional material on four sides perpendicular to the ABS as illustrated in FIG. 4. Wafer 17 is shown after a plurality of heads (or sliders) 20 have been deposited on the wafer surface. The line labeled M represents a cut in the wafer 17 made to separate the heads 20 from wafer 17. Lines K, J, P, Q, R and S mark future cut lines. Each of the heads 20 have a read head 30 and a write head 40 fabricated parallel to the ABS which is also the upper surface of the wafer 17. The elements in FIG. 4 are not to scale, since the actual sizes of the read and write heads 30, 40 are much smaller than shown in relation the head 20 as will be clear to those skilled in the art. The position of the read and write heads 30, 40 on the head 20 is also not representative. Preferably the read and write heads 30, 40 will be located very near the edge which will be the trailing edge of the head 20 when installed in the magnetic storage device. Since lapping is not required in a process according to the invention, critical alignment of the read head to the write head in the "z" direction is not required. The need to align in the "z" direction is reduced since the critical structures are formed by deposition thicknesses rather than mechanical removal of material. However, with all heads, the centerline placement of the read sensor relative to the center line placement of the write gap does rely on alignment and this is accomplished with lithography. In the prior art scheme, read to write head alignment in the "z" direction was required since the end of lapping determines the final stripe height of the read sensor, as well as, critical dimensions in the write head. In heads for perpendicular recording, however, the prior art ABS processing is even less effective in forming precise dimensions simultaneously in the read sensor and the write head. For example, in some perpendicular head designs, the top of the read sensor must be referenced to the top of the trailing shield type of return pole piece and lapping simultaneously reduces the thickness of the trailing shield and the stripe height making it difficult to precisely control both dimensions. In a process according to the invention the planarization of the ABS including the top of a trailing shield and a read sensor can be accomplished with a simple planarization step, e.g. chemical-mechanical planarization (CMP) and the trailing shield and sensor thickness are determined by deposition of thin films rather than lapping. In addition, the invention allows for the fabrication of simple single pole heads with the shape of the pole tip formed by ion milling and lithography.

The advantages of building a recording head with return pole piece or shield formed parallel to the ABS (i.e. incorporating a head design with the ABS parallel to the wafer processing surfaces) include:

1. control of the shield and sensor thickness is determined by deposition rather than lapping.
2. the write gap is controlled by a lithography step
3. shape of critical ABS features is controlled by lithography using a thin resist rather than a tall resist structure.
4. alignment of critical component is controlled by lithography.
5. non-rectilinear shield shapes that conform around the main (write) pole can be lithographically formed.

Figure 1:
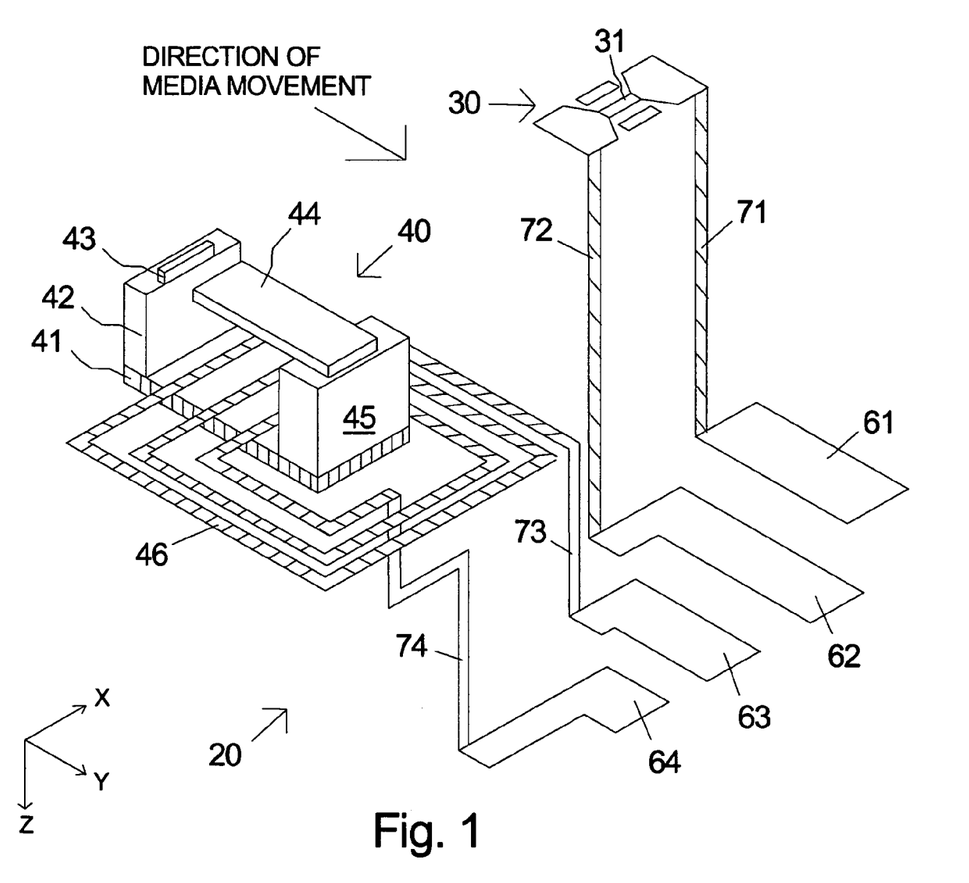
FIG. 1 is an isometric illustration of selected components of a head according to an embodiment of the invention.
Figure 5:
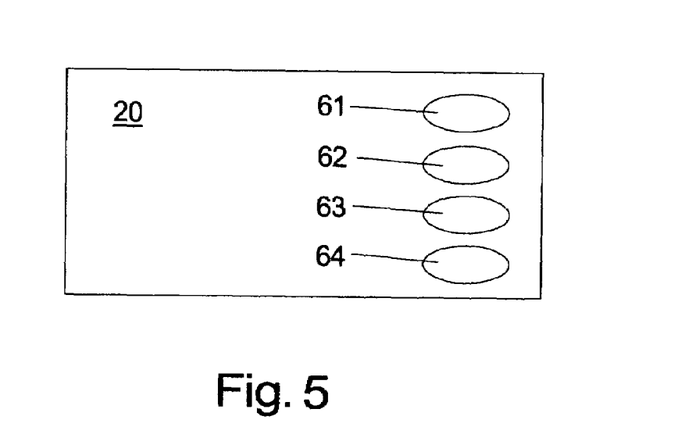
FIG. 5 is an illustration of the bottom surface, opposite to the ABS, of a embodiment of a head according to the invention.

For an overview of a head 20 according to the invention reference is made to FIG. 1 which is an isometric illustration of selected components with the overcoat and substrate removed. This embodiment is a trailing shield design. The drawing is not to scale since the large range in sizes would make it unclear. Except where noted below the relative sizes are according to the prior art and will be apparent to those skilled in the art. The X and Y-dimensions indicated in FIG. 1 are parallel to the surface of the wafer and the Z-dimension is orthogonal to the surface of the wafer. The direction of intended media movement is along the Y-axis from left to right in the figure. The read head 30 and the write head 40 are arranged side-by-side in this embodiment in relation to the direction of the movement of the media. This invention uses lead pads 61, 62, 63, 64 that are disposed on the bottom of the head 20 which is also the bottom of the wafer during fabrication. The read head 30 and write head 40 are placed side by side in the embodiment of FIG. 1. Lead pads 61, 62, 63, 64 are, therefore, in a common plane on the bottom of the wafer as is also shown in FIG. 5. The read head 30 and the write head 40 are formed on the top surface of the wafer. The electrical connectors 71, 72, 73, 74 extend through the wafer from top to bottom, i.e. in the Z-dimension, to connect the read head 30 and the write head 40 to the lead pads 61, 62, 63, 64. One method of fabricating the relatively deep, e.g. 200 um) vias for the electrical connectors 71, 72, 73, 74 uses deep RIE processing into a silicon body. The vias can be filled with Cu to form the connections. The coil 46 in the write head 40 is connected to electrical connectors 73, 74 which in turn connect to the lead pads 64, 63. The coil 46 is made of electrically conductive material and can be spiral or helical. A one layer coil can be defined in a single lithography step since the turns are coplanar on the surface of the wafer at this point in the fabrication process. Although only three turns are shown in the illustration, the coil can have other numbers of turns according to known principles. The yoke of the electromagnet in the write head 40 includes the back of the yoke 41 which is made of ferromagnetic material and is formed prior to the coil 46. The back of the yoke 41 in this embodiment is rectilinear with the two longest dimensions extending parallel to the surface of the wafer. The dimensions of the back of the yoke, along with the dimensions of the other structures of the head, can be determined according to prior art principles except where expressly noted. Dimensions given for structures in specific embodiments should not be taken as limitations on the invention. As an example, the back of the yoke (41) can be made approximately 1 um to 2 um thick (Z), 2 um to 20 um wide (X) and 10 um to 30 um long (Y). The back of the yoke (41) can be formed by electroplating or by vacuum deposition. It can be laminated with alternating layers of ferromagnetic materials and insulating materials. At the ends of the back of the yoke vertical pole pieces 42, 45 extend from the back of the yoke along the sides of the coil 46 toward the ABS. The inside vertical pole piece 45, which extends through the interior of the coil 46 is preferably made thicker (Y) than the outside vertical pole piece 42 since it is the inside vertical pole piece 45 which is in the return flux path. Various embodiments of the invention can have differing pole piece tips as will be seen more clearly below, but in the embodiment shown in FIG. 1, the outside vertical pole piece 42 has main pole piece 43 disposed on top, i.e., nearer to the ABS. The main pole piece 43 is preferably made of a high moment ferromagnetic material, which can be different from the material used for the yoke pieces 41, 42, 45. The main pole piece 43 is preferably smaller in the X and Y dimensions than the outside vertical pole piece 42 in order to concentrate the writing flux. The return pole piece 44 is disposed on top of the inside vertical pole piece 45. The thickness of return pole piece 44 is indicated by dotted lines and arrows as the thickness of the thin film in FIG. 2. It should be noted that the return pole piece 44 and main pole piece 43 are deposited to substantially identical thickness and, in fact, are preferably deposited at the same time. The plane of the thin films is marked and is parallel to the ABS. In the embodiment of FIG. 1 the return pole piece 44 is narrower (X-dimension) than the inside vertical pole piece 45, but is significantly wider (Y-dimension) than the inside vertical pole piece 45. The return pole piece 44 extends from the inside vertical pole piece 45 toward the main pole piece 43 in the Y-dimension to reduce the width of the write gap. At the write gap the confronting surfaces of the main pole piece 43 and the return pole piece 44 are similar in width (X-dimension). The area of the return pole piece 44 in the plane (X-Y) that is parallel to the ABS is made significantly larger than that of the main pole piece 43 in order to reduce the strength of the return field. In this embodiment the inside surface, i.e. the surface facing the write gap, of the main pole piece 43 is coplanar with the inside surface of the outside vertical pole piece 42. In other embodiments the return pole piece and the main pole piece can be shaped and positioned in other ways as will be seen.

Figure 3:
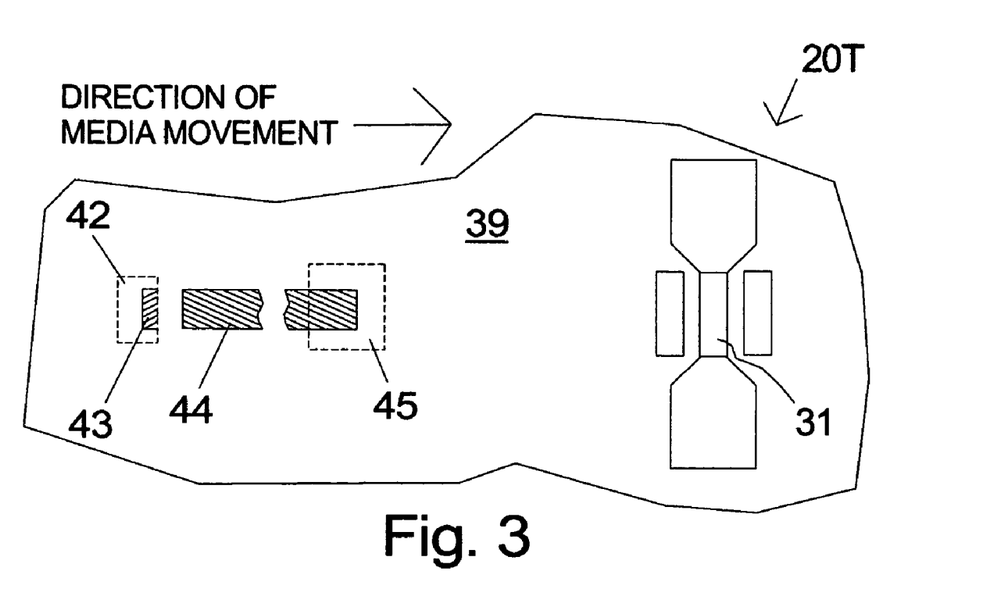
FIG. 3 illustrates a tandem arrangement the write head and read head viewed from the ABS according to an embodiment of the invention.

The read head 30 is substantially independent from the write head 40. The read head and the write head can be positioned in parallel or tandem with respect to each other and the track direction and there are no electrical connections between them. The lead pads 61, 62 for the read head are conveniently placed in the same plane as the lead pads 63, 64 for the write head. Likewise the sensor 31 is conveniently placed in approximately the same plane as the main pole piece 43. A write head 40 according to the invention can be used with a variety of read head designs with a sensor structure that is planar with film layers parallel to the wafer surface. FIG. 3 illustrates an ABS view of an embodiment of the invention similar to that of FIG. 1 except that in head 20T the read head and the write head are arranged in tandem. Side-by-side or tandem arrangement of the read and write heads are possible with the design of the invention.

Conventional ABS features (not shown) can be formed at the wafer level with RIE into an overcoat, e.g. $SiO_2$, which can be deposited after the features of the read and write heads have been formed.

Figure 2A:
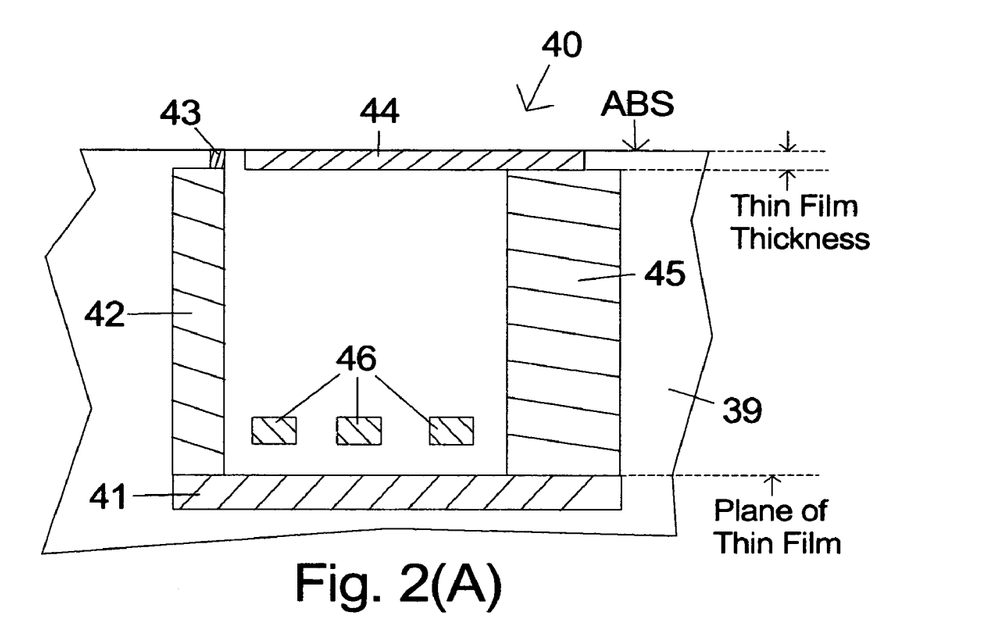
FIG. 2(A) illustrates a midline section, perpendicular to the wafer surface, of a write head with a trailing shield according to an embodiment of the invention.
Figure 2B:
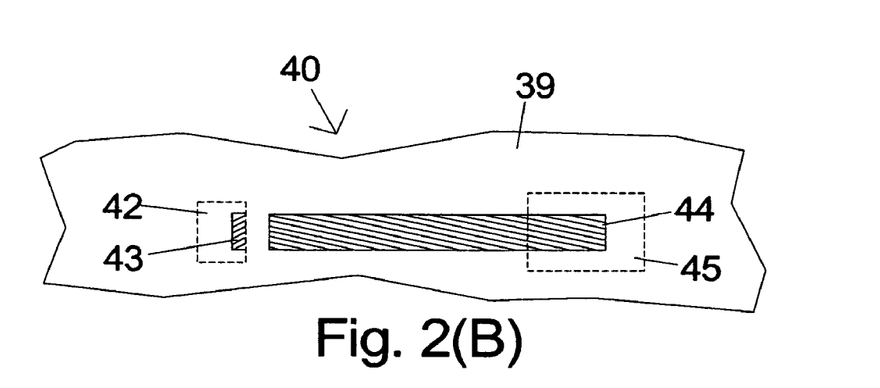
FIG. 2(B) illustrates the components of the write head of FIG. 2(A) viewed from the wafer surface which is also the ABS.

FIG. 2(A) illustrates a section of the write head 40 of FIG. 1 taken perpendicular to the ABS. The body material 39 which surrounds the structures of the write head is shown. The overcoat which will typically separate the magnetic components from the air and the media surface is (not shown). In this view the fact that the inside surfaces of the main pole piece 43 and the outside vertical pole piece 42 and coplanar is seen. It should also be noted that the outside vertical pole piece 42 is preferably thicker than the inside vertical pole piece 45 since the later is part of the flux return circuit. In a write head according to the invention the critical pole features and the return pole features are defined on a wafer surface that is the ABS surface. This allows for thickness control of the return shields to be controlled by deposition rather than lapping. This allows for shape control of the return shields and the main pole on the abs to be formed by lithography and simple ion milling of thin materials. FIG. 2(B) illustrates the view from the ABS of write head 40 of FIG. 1. The inside vertical pole piece 45 and the outside vertical pole piece 42 are shown in dotted lines since they are recessed from the ABS.

An alternative embodiment of a write head 40 according to the invention. can include side shields (not shown). As in other side shield designs their purpose is to reduce side writing. In order to improve the manufacturability of the write head, a main standoff (not shown) is formed on the top of the outside vertical pole pieces 42. The main standoff has the same shape as the main pole piece 43 which is substantially smaller than the outside vertical pole piece 42. The inclusion of the main standoff creates a clearance region between the outside vertical pole piece 42 and the side shield portion of the side shield return pole piece. A matching return standoff is formed on top of the inside vertical pole piece 45 to, in effect, increase the height of the inside vertical pole piece 45 so that the side shield return pole piece is connected to the inside vertical pole piece 45. Neither pole tip 43 nor standoff layer need be coplanar to the inside edge of pole piece 42. In addition the inside and outside edges of pole tip 43 and standoff layer need not be coplanar. Specifically, the length (Y direction in FIG. 1) of pole piece 43 can be smaller than the length of standoff layer.

A head according to the invention can be fabricated using standard thin film fabrication techniques. However, some standard techniques can be used in new ways. For example, the write gap in a head according to the invention can determined by lithography and subtractive processing (milling or RIE). The main pole piece and the return pole piece are formed in the same thin film plane; therefore, the write gap is determined by the lithography used to form these magnetic structures. In embodiments with side shields, the side gap is similarly controlled. In fact, the critical shapes, positions and dimensions of all of the features at the ABS, including the read sensor, in a head according to the invention can similarly be determined by lithography with the full range of thin film fabrication techniques being available.

A planar read head with film layers parallel to the ABS surface will be described. A planar read head allows for the fabrication of head structures with all ABS processing being on surfaces parallel to the wafer surface. This results in simplified head structures. The shield to shield spacing or read gap in the prior art sensor now translates to a sensor height in the read sensor in the planar head according to the invention. The sensor track-width in both cases are identical and determine the tracks-per-inch (TPI) characteristics of the sensors. It is important that the actual sense layer in the planar sensor be positioned critically close to the ABS which is the surface of the wafer, so that the fields from the transitions do not decay and result in lost signal. In current applications that spacing should be less than 3 to 7 nm.

Figure 6:
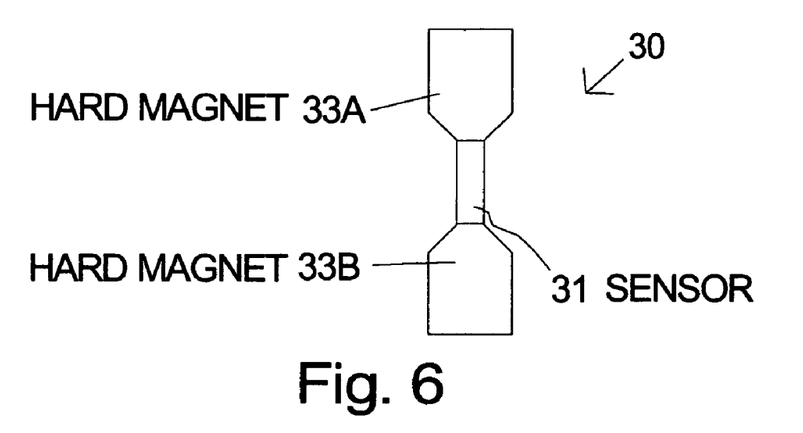
FIG. 6 is an illustration of an embodiment of a read head according to the invention using hard biasing with a contiguous junction as viewed from the ABS.
Figure 7:
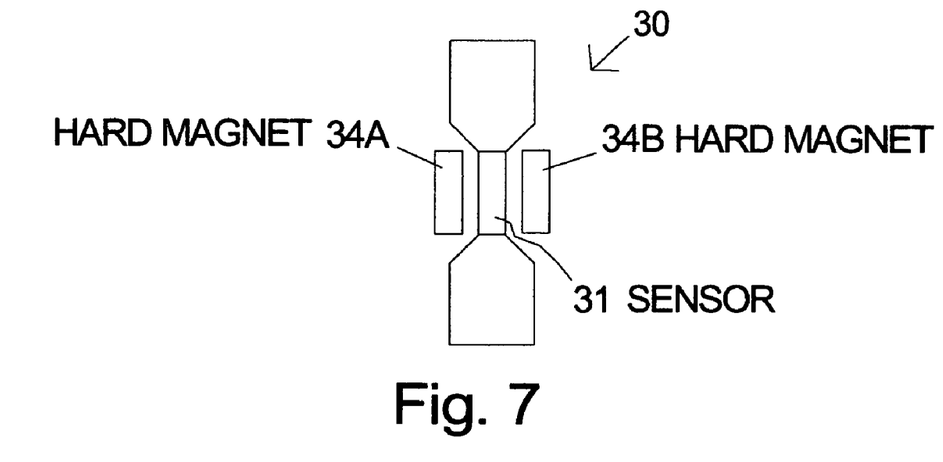
FIG. 7 is an illustration of an embodiment of a read head according to the invention using external hard magnetic materials for biasing as viewed from the ABS.

The sensor in a planar read head may be stabilized by traditional junction methods and may also be stabilized by in-stack and external hard magnet sources. The sensor may be unshielded or may have effective shielding introduced by aperture shields or by flux collectors. The read head can also include a flux collector located in a plane below the sensor film stack. The contiguous junction bias scheme for a read head 30 is illustrated in FIG. 6 where hard magnets 33A, 33B abut sensor 31 on the ends. The sensor can also be stabilized by external hard magnetic materials that are not in contact with the sensor. FIG. 7 illustrates an embodiment of the read head 30 according to the invention which uses external hard magnets 34A, 34B disposed on the up-track and down-track sides of sensor 31. The hard magnets 34A, 34B in the embodiment of FIG. 7 are slightly separated from the sides of the sensor 31 by non-magnetic material and, therefore, do not share a junction with the sensor 31.

Figure 8A:
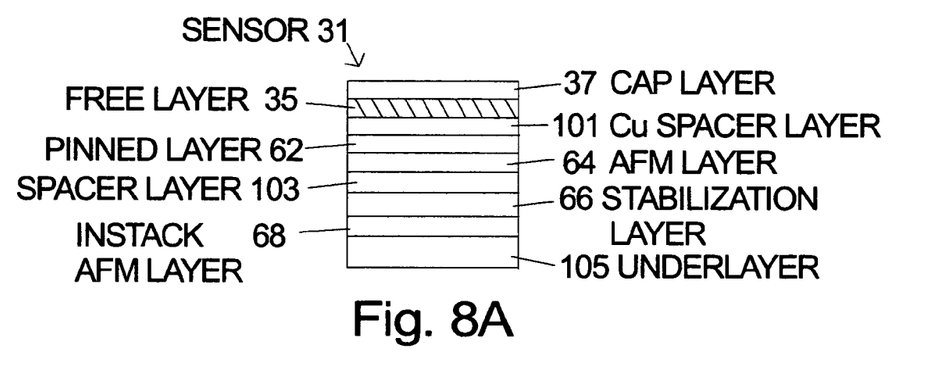
FIG. 8A is an illustration of an embodiment of a read head according to the invention with a sensor layer structure including in-stack AFM stabilization as viewed in section perpendicular to the ABS.
Figure 8B:
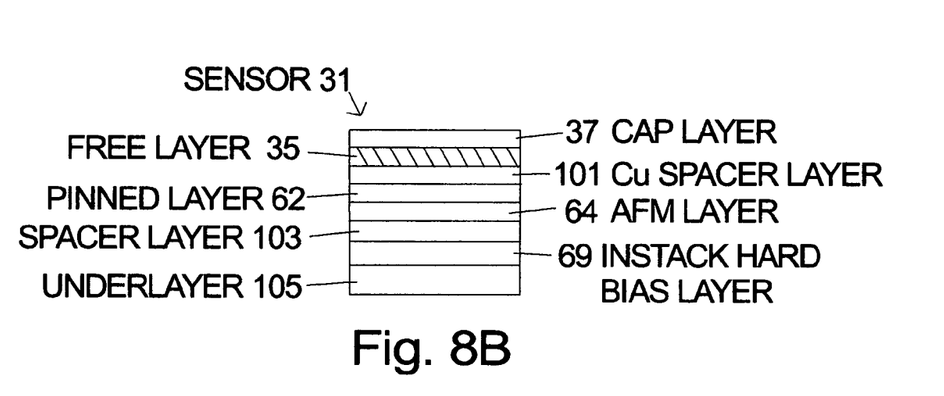
FIG. 8B is an illustration of an embodiment of a read head according to the invention with a sensor layer structure including in-stack hard bias stabilization as viewed in section perpendicular to the ABS.

Embodiments of sensor 31 using in-stack biasing are illustrated in FIGS. 8A and 8B. These figures show selected layers of the plurality of layers that comprise an embodiment prior art spin valve. The planar head design does not limit the sensor design to any particular combination of layers, therefore, any prior art layer combination can be used so long as the constraints on the spacing described above are met. FIG. 8A shows a sensor biased with an in-stack layer of ferromagnetic bias material or stabilization material (66) that is coupled to an in-stack antiferromagnetic layer (AFM) 68. The uppermost layer is the cap layer 37. It is conventional for sliders to have an overcoat layer which is not shown in FIG. 8A or 8B. The overcoat layer adds to the separation between the ferromagnetic free layer 35 and the magnetic medium. The free layer 35, Cu spacer layer 101, pinned layer 62, AFM layer 64, and underlayer 105 are standard parts of a spin valve. In-stack biasing using an antiferromagnetic bias structure is formed using a spacer layer 103, a ferromagnetic bias layer or stabilization material 66 and an antiferromagnetic layer 68. The spacer layer 103 can be insulating (alumina, SiO) or it may be a conducting metal (Ta, Ru) with typical thickness in the range from 1 nm to 10 nm. The in-stack bias structure is on the bottom of the sensor stack below the reference layer antiferromagnetic layer 64. FIG. 8B shows a sensor biased with an in-stack layer of hard magnetic material 69. Again, the uppermost layer is the cap layer 37. It is conventional for sliders to have an overcoat layer which is not shown in FIG. 8A. The overcoat layer adds to the separation between the ferromagnetic free layer 35 and the magnetic medium. The free layer 35, Cu spacer layer 101, pinned layer 62, AFM layer 64, and underlayer 105 are standard parts of a spin valve. In-stack biasing using a hard magnetic structure is formed using a spacer layer 103 and a layer of hard magnetic material 69. The spacer layer 103 can be insulating (alumina, SiO) or it may be a conducting metal (Ta, Ru) with typical thickness in the range from 1 nm to 100 nm. The hard magnetic material can be CoPtCr or any alloy of CoPtX with high magnetic coercivity. Typical thickness range is in the 10 nm to 100 nm range. The in-stack bias structure is on the bottom of the sensor stack below the reference layer antiferromagnetic layer 64.

Figure 9:
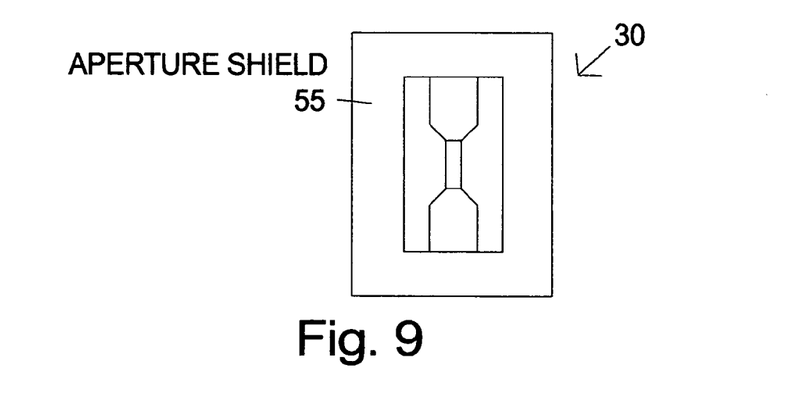
FIG. 9 illustrates an embodiment of the read head with an aperture shield around the sensor as viewed from the ABS.
Figure 10:
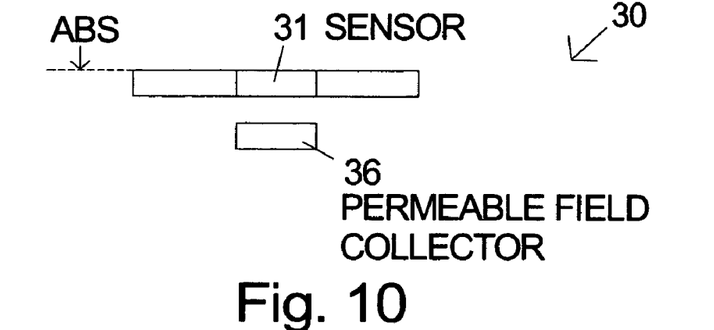
FIG. 10 illustrates an embodiment of the read head with a permeable field collector beneath the sensor as viewed in section perpendicular to the ABS.
Figure 11:
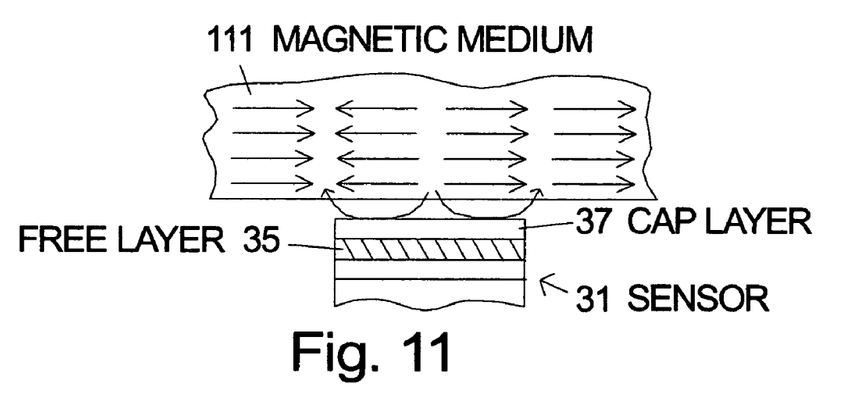
FIG. 11 illustrates that the planar read of the invention detects (for longitudinal recording) the component of field from the magnetic transitions in magnetic medium that is parallel to the ABS.

The embodiments of the planar read head in FIGS. 6 and 7 have no shields. Reference is made to FIG. 11 to illustrate that resolution is controlled primarily by the magnetic spacing between the disk surface (magnetic medium 111) and the sense or free layer 35 of the sensor 31 and by the physical height and track-width of the sensor. Important components of the magnetic spacing are the cap layer 37 on the sensor 31, the overcoat on the slider (not shown), and the flying height. If this separation becomes too large then the resolution will degrade from that of a traditional sensor shielded at the ABS. However, using the planar geometry, two possible resolution improvements will be shown. FIG. 10 illustrates an embodiment of the read head 30 with a permeable flux collector 36 beneath the sensor 31. The flux collector is a thin film of permeable material, for example 10 nm to 100 nm of NiFe. The permeable characteristics of this film attract the magnetic field from the disk and thereby localize the fields onto the sensor structure. FIG. 9 illustrates an embodiment of the read head 30 with an aperture shield 55 around the sensor 31 as viewed from the ABS. The aperture structure is formed with permeable material, for example 10 nm to 100 nm to NiFe. The aperture structure overlaps the lead region of the sensor but is insulated from the leads of the sensor. The permeable characteristics of the NiFe material serves to shield the sensor from the magnetic fields of magnetization transitions which are adjacent to the magnetic transition (or magnetic field) that is being detected by the sensor.

Figure 12:
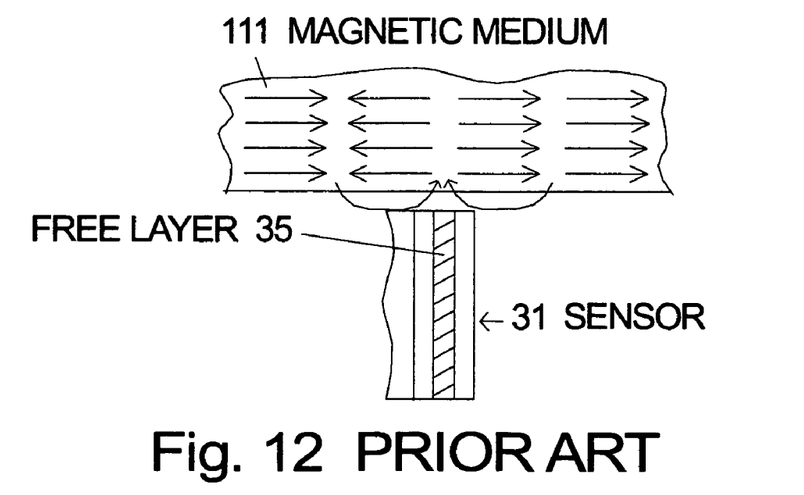
FIG. 12 illustrates that the prior art sensor detects the component of field from the transitions that is orthogonal to the ABS.

FIG. 11 illustrates that the planar read of the invention detects (for longitudinal recording) the component of field from the magnetic transitions in magnetic medium 111 that is parallel to the ABS. In contrast FIG. 12 illustrates that the prior art sensor detects the component of field from the transitions that is orthogonal to the ABS. As noted the read sensor in both the planar embodiment as well as the prior art have multiple component layers. The free layer 35 is shown for each sensor type in FIGS. 11 and 12. For perpendicular recording, the field components are reversed for the two sensor types.

The invention has been described with respect to particular embodiments, but other uses and applications for the ferromagnetic structure according to the invention will be apparent to those skilled in the art.

The invention claimed is:

1. A thin film magnetic head comprising:
a substrate with a plurality of thin film structures formed on a surface of the substrate, a plane of the thin film structures being parallel to the surface of the substrate and perpendicular to a thickness of the thin film structures with the thickness being a smallest dimension of the thin film structures;
an air-bearing surface that is parallel to the plane of the thin film structures, the air-bearing surface being bounded by cut surfaces extending perpendicular to the air-bearing surface; and
a read head with a sensor comprising a plurality of thin films including a free layer of ferromagnetic material, the free layer being formed from a ferromagnetic thin film deposited on the surface of the substrate with a thickness of the ferromagnetic thin film being disposed orthogonally to the air-bearing surface with the sensor being disposed on the air-bearing surface with none of the cut surfaces passing through the free layer; and
wherein the read head further comprises first and second hard magnetic contiguous junction bias structures disposed with first and second contiguous junctions with the sensor, the first and second contiguous junctions being on opposing ends of the sensor, the opposing ends of the sensor being separated by a longest dimension of the sensor.

2. A thin film magnetic head comprising:
a substrate with a plurality of thin film structures formed on a surface of the substrate, a plane of the thin film structures being parallel to the surface of the substrate and perpendicular to a thickness of the thin film structures with the thickness being a smallest dimension of the thin film structures;
an air-bearing surface that is parallel to the plane of the thin film structures, the air-bearing surface being bounded by cut surfaces extending perpendicular to the air-bearing surface; and
a read head with a sensor comprising a plurality of thin films including a free layer of ferromagnetic material, the free layer being formed from a ferromagnetic thin film deposited on the surface of the substrate with a thickness of the ferromagnetic thin film being disposed orthogonally to the air-bearing surface with the sensor being disposed on the air-bearing surface with none of the cut surfaces passing through the free layer; and
wherein the read head further comprises first and second hard magnetic structures disposed on first and second sides of the sensor as viewed from the air-bearing surface, the first and second hard magnetic structures being separated from the sensor by non-magnetic material.

3. A thin film magnetic head comprising:
a substrate with a plurality of thin film structures formed on a surface of the substrate, a plane of the thin film structures being parallel to the surface of the substrate and perpendicular to a thickness of the thin film structures with the thickness being a smallest dimension of the thin film structures;
an air-bearing surface that is parallel to the plane of the thin film structures, the air-bearing surface being bounded by cut surfaces extending perpendicular to the air-bearing surface; and
a read head with a sensor comprising a plurality of thin films including a free layer of ferromagnetic material, the free layer being formed from a ferromagnetic thin film deposited on the surface of the substrate with a thickness of the ferromagnetic thin film being disposed orthogonally to the air-bearing surface with the sensor being disposed on the air-bearing surface with none of the cut surfaces passing through the free layer; and
wherein the sensor is disposed at the air-bearing surface and the read head further comprises a permeable magnetic field collector disposed beneath the sensor as viewed in a section perpendicular to the air-bearing surface with the permeable magnetic field collector being disposed on an opposite side of the sensor with respect to the air-bearing surface.

4. A thin film magnetic head comprising:
a substrate with a plurality of thin film structures formed on a surface of the substrate, a plane of the thin film structures being parallel to the surface of the substrate and perpendicular to a thickness of the thin film structures with the thickness being a smallest dimension of the thin film structures;
an air-bearing surface that is parallel to the plane of the thin film structures, the air-being surface being bounded by cut surfaces extending perpendicular to the air-bearing surface; and
a read head with a sensor comprising a plurality of thin films including a free layer of ferromagnetic material, the free layer being formed from a ferromagnetic thin film deposited on the surface of the substrate with a thickness of the ferromagnetic thin film being disposed orthogonally to the air-bearing surface with the sensor being disposed on the air-bearing surface with none of the cut surfaces passing through the free layer; and
wherein the read head further comprises an aperture shield surrounding the sensor as viewed from the air-bearing surface.

5. A thin film magnetic head comprising:
a substrate with a plurality of thin film structures formed on a surface of the substrate, a plane of the thin film structures being parallel to the surface of the substrate and perpendicular to a thickness of the thin film structures with the thickness being a smallest dimension of the thin film structures;
an air-bearing surface that is parallel to the plane of the thin film structures, the air-bearing surface being bounded by cut surfaces extending perpendicular to the air-bearing surface; and
a read head with a sensor comprising a plurality of thin films including a free layer of ferromagnetic material, the free layer being formed from a ferromagnetic thin film deposited on the surface of the substrate with a thickness of the ferromagnetic thin film being disposed orthogonally to the air-bearing surface with the sensor being disposed on the air-bearing surface with none of the cut surfaces passing through the free layer; and
wherein the sensor further comprises an in-stack bias layer of hard magnetic material.

6. The thin film magnetic recording head of claim 5 wherein the in-stack bias layer of hard magnetic material is disposed at a bottom of the plurality of layers in the sensor.

7. A thin film magnetic head comprising:
a substrate with a plurality of thin film structures formed on a surface of the substrate, a plane of the thin film structures being parallel to the surface of the substrate and perpendicular to a thickness of the thin film structures with the thickness being a smallest dimension of the thin film structures;
an air-bearing surface that is parallel to the plane of the thin film structures, the air-bearing surface being bounded by cut surfaces extending perpendicular to the air-bearing surface; and
a read head with a sensor comprising a plurality of thin films including a free layer of ferromagnetic material, the free layer being formed from a ferromagnetic thin film deposited on the surface of the substrate with a thickness of the ferromagnetic thin film being disposed orthogonally to the air-bearing surface with the sensor being disposed on the air-bearing surface with none of the cut surfaces passing through the free layer; and
wherein the sensor has a shape as viewed from the air-bearing surface with the shape being determined by lithography.

8. A thin film magnetic head comprising:
a substrate with a plurality of thin film structures formed on a surface of the substrate, a plane of the thin film structures being parallel to the surface of the substrate and perpendicular to a thickness of the thin film structures with the thickness being a smallest dimension of the thin film structures;
an air-bearing surface that is parallel to the plane of the thin film structures, the air-bearing surface being bounded by cut surfaces extending perpendicular to the air-bearing surface;
a read head with a sensor comprising a plurality of thin films including a free layer of ferromagnetic material, the free layer being formed from a ferromagnetic thin film deposited on the surface of the substrate with a thickness of the ferromagnetic thin film being disposed orthogonally to the air-bearing surface with the sensor being disposed on the air-bearing surface with none of the cut surfaces passing through the free layer; and a write head disposed in a side-by-side orientation with the read head with respect to a predetermined direction of media movement.

9. A thin film magnetic head comprising:

a substrate with a plurality of thin film structures formed on a surface of the substrate, a plane of the thin film structures being parallel to the surface of the substrate and perpendicular to a thickness of the thin film structures with the thickness being a smallest dimension of the thin film structures;

an air-bearing surface that is parallel to the plane of the thin film structures, the air-bearing surface being bounded by cut surfaces extending perpendicular to the air-bearing surface;

a read head with a sensor comprising a plurality of thin films including a free layer of ferromagnetic material, the free layer being formed from a ferromagnetic thin film deposited on the surface of the substrate with a thickness of the ferromagnetic thin film being disposed orthogonally to the air-bearing surface with the sensor being disposed on the air-bearing surface with none of the cut surfaces passing through the free layer; and a write head disposed in a tandem orientation with the read head with respect to a predetermined direction of media movement.

10. A thin film magnetic head comprising:

a substrate with a plurality of thin film structures formed on a surface of the substrate, a plane of the thin film structures being parallel to the surface of the substrate and perpendicular to a thickness of the thin film structures with the thickness being a smallest dimension of the thin film structures;

an air-bearing surface that is parallel to the plane of the thin film structures, the air-bearing surface being bounded by cut surfaces extending perpendicular to the air-bearing surface;

a read head with a sensor comprising a plurality of thin films including a free layer of ferromagnetic material, the free layer being formed from a ferromagnetic thin film deposited on the surface of the substrate with a thickness of the ferromagnetic thin film being disposed orthogonally to the air-bearing surface with the sensor being disposed on the air-bearing surface with none of the cut surfaces passing through the free layer; and a write head with a main pole piece and a return pole piece wherein material for the main pole piece and the return pole piece are part of one thin film.

11. A film magnetic head comprising:

a substrate with a plurality of thin film structures formed on a surface of the substrate, a plane of the thin film structures being parallel to the surface of the substrate and perpendicular to a thickness of the thin film structures with the thickness being a smallest dimension of the thin film structures;

an air-bearing surface that is parallel to the plane of the thin film structures, the air-bearing surface being bounded by cut surfaces extending perpendicular to the air-bearing surface;

a read head with a sensor comprising a plurality of thin films including a free layer of ferromagnetic material, the free layer being formed from a ferromagnetic thin film deposited on the surface of the substrate with a thickness of the ferromagnetic thin film being disposed orthogonally to the air-bearing surface with the sensor being disposed on the air-bearing surface with none of the cut surfaces passing through the free layer; and a write head with a main pole piece and a return pole piece wherein the return pole piece is a thin film structure disposed in a plane parallel to the air-bearing surface with a thickness of the thin film structure being perpendicular to the air-bearing surface.

12. A thin film magnetic head comprising:

a substrate with a plurality of thin film structures formed on a surface of the substrate, a plane of the thin film structures being parallel to the surface of the substrate and perpendicular to a thickness of the thin film structures with the thickness being a smallest dimension of the thin film structures;

an air-bearing surface that is parallel to the plane of the thin film structures, the air-bearing surface being bounded by cut surfaces extending perpendicular to the air-bearing surface; and a read head with a sensor comprising a plurality of thin films including a free layer of ferromagnetic material, the free layer being formed from a ferromagnetic thin film deposited on the surface of the substrate with a thickness of the ferromagnetic thin film being disposed orthogonally to the air-bearing surface with the sensor being disposed on the air-bearing surface with none of the cut surfaces passing through the free layer; and wherein the air-bearing surface has four cut edges extending perpendicular to the air-bearing surface with zero cut edges passing through the sensor.

13. A disk drive comprising:

a magnetic recording medium; and a magnetic head including:

a substrate with a plurality of thin film structures formed on a surface of the substrate;

an air-bearing surface that is parallel to the surface of the substrate, the air-bearing surface being bounded by cut surfaces extending perpendicular to the air-bearing surface; and a read head with a sensor comprising a plurality of thin films including a free layer of ferromagnetic material, the free layer being formed from a ferromagnetic thin film deposited on the surface of the substrate with a thickness of the ferromagnetic thin film being disposed orthogonally to the air-bearing surface with the sensor being disposed on the air-bearing surface with none of cut surfaces passing through the free layer; and wherein the read head further comprises first and second hard magnetic contiguous junction bias structures disposed with first and second contiguous junctions with the sensor, the first and second contiguous junctions being on opposing ends of the sensor, the opposing ends of the sensor being separated by a longest dimension of the sensor.

14. A disk drive comprising:

a magnetic recording medium; and a magnetic head including:

a substrate with a plurality of thin film structures formed on a surface of the substrate;

an air-bearing surface that is parallel to the surface of the substrate, the air-bearing surface being bounded by cut surfaces extending perpendicular to the air-bearing surface; and a read head with a sensor comprising a plurality of thin films including a free layer of ferromagnetic material, the free layer being formed from a ferromagnetic thin film deposited on the surface of the substrate with a thickness of the ferromagnetic thin film being disposed orthogonally to the air-bearing surface with the sensor being disposed on the air-bearing surface with none of cut surfaces passing through the free layer; and wherein the read head further comprises first and second hard magnetic bias structures disposed on first and second sides of the sensor as viewed from the air-bearing surface, the first and second hard magnetic bias structures being separated from the sensor by non-magnetic material.

15. A disk drive comprising:
a magnetic recording medium; and
a magnetic head including:
a substrate with a plurality of thin film structures formed on a surface of the substrate;
an air-bearing surface that is parallel to the surface of the substrate, the air-bearing surface being bounded by cut surfaces extending perpendicular to the air-bearing surface; and
a read head with a sensor comprising a plurality of thin films including a free layer of ferromagnetic material, the free layer being formed from a ferromagnetic thin film deposited on the surface of the substrate with a thickness of the ferromagnetic thin film being disposed orthogonally to the air-bearing surface with the sensor being disposed on the air-bearing surface with none of cut surfaces passing through the free layer; and
wherein the sensor is disposed at the air-bearing surface and the read head further comprises a permeable magnetic field collector disposed below the sensor as viewed in a section perpendicular to the air-bearing surface with the permeable magnetic field collector being disposed on an opposite side of the sensor with respect to the air-bearing surface.

16. A disk drive comprising:
a magnetic recording medium; and
a magnetic head including:
a substrate with a plurality of thin film structures formed on a surface of the substrate;
an air-bearing surface that is parallel to the surface of the substrate, the air-bearing surface being bounded by cut surfaces extending perpendicular to the air-bearing surface; and
a read head with a sensor comprising a plurality of thin films including a free layer of ferromagnetic material, the free layer being formed from a ferromagnetic thin film deposited on the surface of the substrate with a thickness of the ferromagnetic thin film being disposed orthogonally to the air-bearing surface with the sensor being disposed on the air-bearing surface with none of cut surfaces passing through the free layer; and
wherein the read head further comprises an aperture shield surrounding the sensor as viewed from the air-bearing surface.

17. A disk drive comprising:
a magnetic recording medium; and
a magnetic head including:
a substrate with a plurality of thin film structures formed on a surface of the substrate;
an air-bearing surface that is parallel to the surface of the substrate, the air-bearing surface being bounded by cut surfaces extending perpendicular to the air-bearing surface; and
a read head with a sensor comprising a plurality of thin films including a free layer of ferromagnetic material, the free layer being formed from a ferromagnetic thin film deposited on the surface of the substrate with a thickness of the ferromagnetic thin film being disposed orthogonally to the air-bearing surface with the sensor being disposed on the air-bearing surface with none of cut surfaces passing through the free layer; and
wherein the sensor further comprises an in-stack bias layer of hard magnetic material.

18. A disk drive comprising:
a magnetic recording medium; and
a magnetic head including:
a substrate with a plurality of thin film structures formed on a surface of the substrate;
an air-bearing surface that is parallel to the surface of the substrate, the air-bearing surface being bounded by cut surfaces extending perpendicular to the air-bearing surface; and
a read head with a sensor comprising a plurality of thin films including a free layer of ferromagnetic material, the free layer being formed from a ferromagnetic thin film deposited on the surface of the substrate with a thickness of the ferromagnetic thin film being disposed orthogonally to the air-bearing surface with the sensor being disposed on the air-bearing surface with none of cut surfaces passing through the free layer; and
wherein the in-stack bias layer of hard magnetic material is disposed at a bottom of the plurality of layers in the sensor.

19. A disk drive comprising:
a magnetic recording medium; and
a magnetic head including:
a substrate with a plurality of thin film structures formed on a surface of the substrate;
an air-bearing surface that is parallel to the surface of the substrate, the air-bearing surface being bounded by cut surfaces extending perpendicular to the air-bearing surface;
a read head with a sensor comprising a plurality of thin films including a free layer of ferromagnetic material, the free layer being formed from a ferromagnetic thin film deposited on the surface of the substrate with a thickness of the ferromagnetic thin film being disposed orthogonally to the air-bearing surface with the sensor being disposed on the air-bearing surface with none of cut surfaces passing through the free layer; and
a write head with a main pole piece and a return pole piece wherein material for the main pole piece and the return pole piece are part of one thin film.

* * * * *